(12) United States Patent
Webb et al.

(10) Patent No.: US 8,251,340 B2
(45) Date of Patent: Aug. 28, 2012

(54) GRIPPING MAT

(75) Inventors: Ian Webb, London (GB); Mark Armstrong, Gwynedd (GB); Tom Cotton, London (GB)

(73) Assignee: Jackel International Limited, Cramlington, Northumberland (GB)

( * ) Notice: Subject to any disclaimer, the term of this patent is extended or adjusted under 35 U.S.C. 154(b) by 308 days.

(21) Appl. No.: 11/666,874

(22) PCT Filed: Nov. 2, 2005

(86) PCT No.: PCT/GB2005/004225
§ 371 (c)(1),
(2), (4) Date: Jun. 9, 2008

(87) PCT Pub. No.: WO2006/048637
PCT Pub. Date: May 11, 2006

(65) Prior Publication Data
US 2008/0245947 A1    Oct. 9, 2008

(30) Foreign Application Priority Data
Nov. 2, 2004    (GB) .................................. 0424272.3

(51) Int. Cl.
*A47G 29/00* (2006.01)
*F16M 11/00* (2006.01)
*A45D 42/14* (2006.01)
*F16B 47/00* (2006.01)

(52) U.S. Cl. .................. 248/683; 248/205.5; 248/205.8; 248/206.3; 248/206.2; 248/205.1; 248/309.3

(58) Field of Classification Search .................. 248/683, 248/205.5, 205.8, 206.3, 206.7, 205.1, 309.3, 248/206.2
See application file for complete search history.

(56) References Cited

U.S. PATENT DOCUMENTS

| | | | |
|---|---|---|---|
| 1,228,649 A * | 6/1917 | Childs | ........................... 248/115 |
| 2,466,502 A | 4/1949 | Stiller | |
| 2,910,264 A | 10/1959 | Lindenberger | |
| 3,071,886 A | 1/1963 | Stiller | |
| 3,101,566 A * | 8/1963 | Stiller | ...................... 248/346.11 |
| 4,756,497 A | 7/1988 | Lan | |

(Continued)

FOREIGN PATENT DOCUMENTS
GB    199159 A    6/1923
(Continued)

OTHER PUBLICATIONS

International Search Report and Written Opinion for PCT/GB2005/004225 mailed Mar. 21, 2006.

(Continued)

*Primary Examiner* — Terrell McKinnon
*Assistant Examiner* — Christopher Garft
(74) *Attorney, Agent, or Firm* — Ungaretti & Harris LLP (57) ABSTRACT

A mat having a resiliently deformable mat portion and a securing element provided thereon for securing an item attached thereto against movement and relative to the mat portion is provided. The mat is arranged to grip a support surface on which the mat portion is laid, in use, by formation of at least a partial vacuum between the mat portion and the support surface upon deformation of the mat portion. The mat comprises a projection arranged to urge the item away from the mat when held by the mat, thereby to create a deformation in the mat portion.

20 Claims, 9 Drawing Sheets

U.S. PATENT DOCUMENTS

| | | | | |
|---|---|---|---|---|
| 4,759,525 | A * | 7/1988 | Cross et al. | 248/346.11 |
| 4,846,429 | A * | 7/1989 | Scheurer et al. | 248/205.8 |
| 5,180,132 | A * | 1/1993 | Pearson et al. | 248/362 |
| 5,762,305 | A * | 6/1998 | Lee | 248/205.8 |
| 5,911,394 | A * | 6/1999 | Lee | 248/205.8 |
| 6,422,402 | B1 * | 7/2002 | Hollinger | 211/50 |
| 6,530,096 | B1 * | 3/2003 | Mayhew et al. | 4/583 |
| 6,596,374 | B1 | 7/2003 | Adjeleian | |
| 6,946,183 | B2 * | 9/2005 | Malpass et al. | 428/99 |
| 2002/0114926 | A1 * | 8/2002 | Malpass et al. | 428/156 |
| 2005/0100711 | A1 * | 5/2005 | Malpass et al. | 428/156 |

FOREIGN PATENT DOCUMENTS

| | | |
|---|---|---|
| GB | 417558 A | 10/1934 |
| JP | 11973048060 | 10/1971 |
| JP | 11986160790 | 10/1998 |
| WO | WO-02/46062 A1 | 6/2002 |

OTHER PUBLICATIONS

Search Report for GB0424272.3 dated Feb. 24, 2005.

* cited by examiner

GRIPPING MAT

CROSS-REFERENCE TO RELATED APPLICATIONS

This Application is a U.S. National filing under §371 of International Application No. PCT/GB2005/004225, with an international filing date of 2 Nov. 2005, now pending, claiming priority from Great Britain Application No. GB04/24272.3, with a filing date of 2 Nov. 2004, now pending, and herein incorporated by reference.

TECHNICAL FIELD

The present invention relates to a mat for holding a utensil.

BACKGROUND OF THE INVENTION

A number of devices have been proposed to provide stable holding means for a utensil placed on a surface the utensil being of the type such as a plate, tray, bowl, cup or other container and securing or at least inhibiting movement of the utensil relative to the surface. For example, DE19933907 is directed to a reversible drink vessel mat for gripping a vessel bottom via a sucker. An example given is for a re-usable beer mat, in which the mat is fitted with claws or adhesive film on the underside and with a sucker on the top side to grip the bottom of the glass. A disadvantage of this device is that because the mat is fixed to a surface, and provides a holding action by virtue of the sucker to a beer glass, the user may have great difficulty in prising the beer glass free from the device without causing any spillage of the beverage from the glass. Furthermore, the mat is not easily removable and may cause damage to the surface to which it is adhered.

A further example is disclosed in WO01/34004 which is directed to an infant utensil having a twist lock coupling to a base. The base can include a suction cup which can be attached to a table. A disadvantage of this device is that of the twist lock coupling is complex and difficult to operate and clean.

SUMMARY OF THE INVENTION

The invention is defined in the attached independent claims. Some optional features of the invention are set out in the dependent claims.

By providing a mat as claimed, disadvantages of the prior art are overcome. Not only does the present invention allow securing of the utensil relative to the support surface, the mat is particularly well adapted to easy storage and carrying as it may be rolled up, at least partially by virtue of its resilient deformability. Further, embodiments of the invention facilitate cleaning of the mat, the mat being made of a material suitable for a "wipe clean" and for cleaning in a dishwasher. The invention has particular application to infant feeding and to training infants to feed. For example, a secure feeding bowl on the table of an infant's highchair removes much of the stress of the feeding experience for both the parent and infant alike.

BRIEF DESCRIPTION OF THE DRAWINGS

Embodiments of the invention will now be described, by way of example only, and with reference to the accompanying drawings in which.

DETAILED DESCRIPTION OF THE INVENTION

Figure 1:
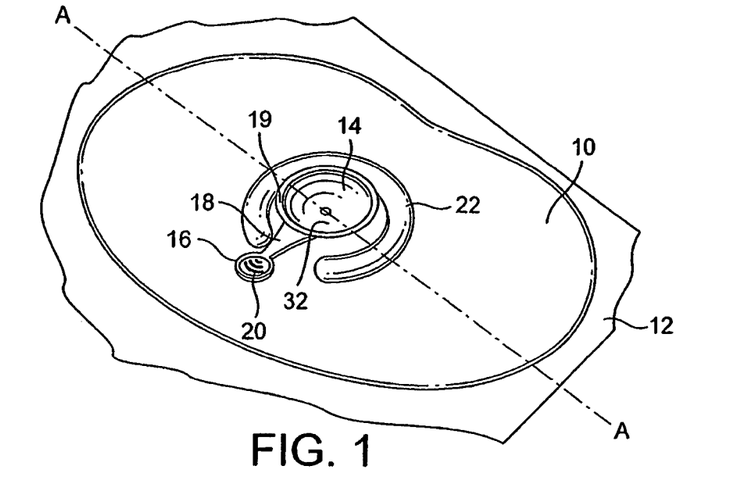
FIG. 1 is a perspective view illustrating a mat in accordance with an embodiment of the present invention.

Referring now to FIG. 1, a mat generally designated 10 comprises a mat portion in the form of a thin layer of flexible material, for example plastics material such as a thermo plastic elastomer (TPE), silicone or rubber of low to medium-shore hardness (shore A28-30). As shown, the mat 10 is suitable for laying out flat on a support service 12 such as the table of an infant's highchair. The mat 10 is in a generally elliptical shape in this embodiment but may of course be of any suitable shape. The mat 10 has a security element 14 which in this embodiment is a suction cup as shown for holding an item such as a bowl, plate, tray or other utensil to the mat. The suction cup 14 has a release 16 connected to the suction cup 14 by means of a flexible strap 18 to form an operating tab which joins the suction cup at the point 19 on an upper peripheral edge of the suction cup at point 19 as shown. The operating device 16 optionally comprises knurling to facilitate a firm grasp of the operating device. The operation of the operating device will be discussed further below. In this embodiment of the present invention, the suction cup is also formed of TPE and, in fact, the entire mat and suction cup may be formed integrally of a single moulding. Alternatively, the mat 10 and a suction cup 14 may be formed separately and joined by suitable fixing means at point 32. The mat 10 also has a raised, resilient rib or ridge 22 shown in the present embodiment as being in a generally circular or open circle substantially in the shape of a horseshoe defining a gap 23. In this embodiment, the ridge 22 is shaped into the mat 10 in the moulding process. Operation of the ridge will be discussed further below. The ridge can be replaced by alternative projection such as one or more hemispherical protrusions arranged in any appropriate pattern.

In this embodiment, the mat 10 has an slight indentation 24 as demonstrated at a point which, in use, will be adjacent to the infant who is feeding. The indentation 24 is to allow easier access for the infant to the utensil which is being held on the mat by the suction cup 14 and therefore ensure that the infant does not have to reach to far in order to access the contents of the utensil.

Figure 2:
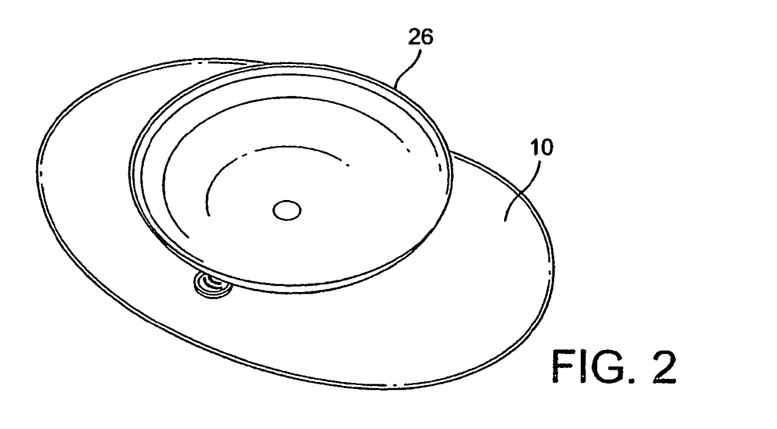
FIG. 2 is a perspective view illustrating a mat according to an embodiment of the present invention with a feeding plate held thereon.
Figure 3:
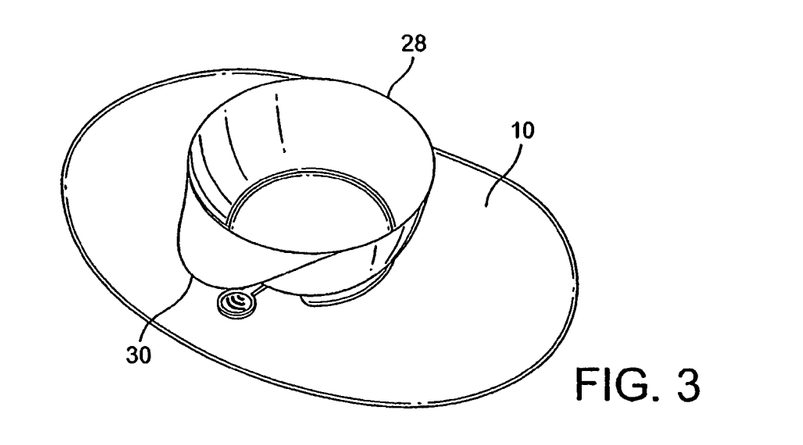
FIG. 3 is a perspective view illustrating a mat according to an embodiment of the present invention with a feeding bowl held thereon.

Referring now to FIG. 2, there is illustrated a feeding plate 26 which is held in position on the mat 10 by the suction cup 14 (not shown). The manner in which a mat 10 in accordance with the present invention may hold a feeding bowl 28 as shown in FIG. 3. It will be seen that the mat 10 is suitable for holding almost any shape of feeding plate or bowl as long as the base of the feeding plate or bowl has a substantially flat and smooth base to allow the suction cup to engage on to the base of the feeding plate or bowl. Of course, it will be appreciated that the base of the feeding plate or bowl does not have to be completely flat or level; any base having a continuous securing portion, for example a domed or curved base will also be sufficient to allow the suction cup to latch on to and thereby engage the feeding plate or bowl securely.

Figure 4A:
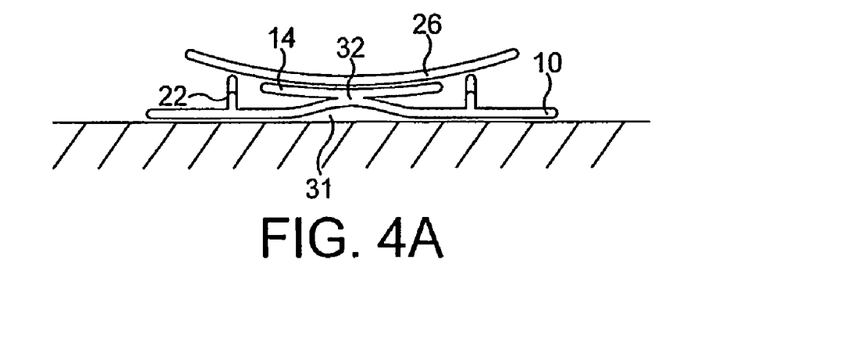
FIGS. 4a to 4c are side views in partial section illustrating the operation of the gripping action of a mat according to an embodiment of the present invention on a support surface.
Figure 4B:
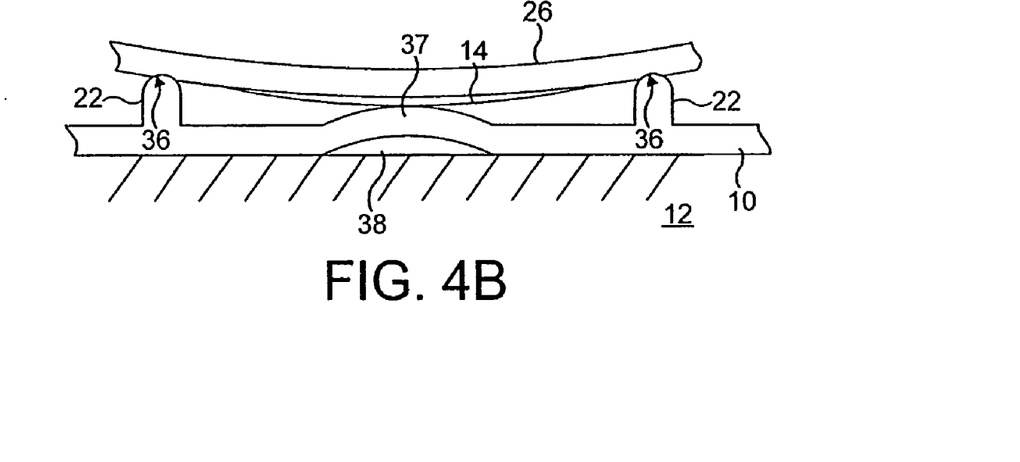
Figure 4C:
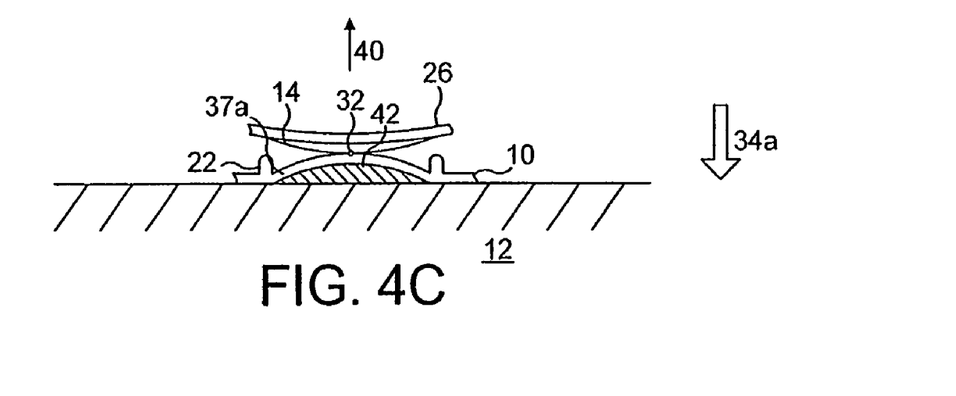

Referring now to FIG. 4a to 4c, the operation of the mat 10 will now be discussed in more detail. FIG. 4a represents a section along a line A-A as shown in FIG. 1. The mat 10 lies atop the support surface 12 which in this instance is a table of an infant's highchair and has a slight concavity 31 in its relaxed configuration acting as a base sucker holding it to the surface. As shown in this section, the feeding plate 26 is secured to the suction cup 14 which is joined to the mat 10 at point 32. The resilient ridge 22 forms the projections touching the underside of the plate 26.

The mat 10 operates by providing a downwardly directed force shown by arrow 34 in order to hold the plate 26 on the mat 10. The resilient ridge 22 or hemispherical projections urges the plate 26 in the direction shown by arrow 36, that is away from the table 12. The reason for this is discussed with reference to FIG. 4b as illustrated. Because resilient ridge 22 operates against the plate 26 in the direction of the arrows 36, it operates against the suction force 34 of the suction cup 14 on the plate 26. The effect of the upwardly directed force 36 is to provide a slight deformation of the mat 10 in the area 37 as shown. This area 37 of deformation is localised and serves to pull the small area 37 of mat 10 away from the surface 12 thereby increasing the concavity 31 to create a volume 38 defined by a lower surface 10 of the mat in the area 37 and by an opposing area of the feeding table 12. As mat 10 may be made at least in part from TPE, which is an inherently "sticky" material, it will stick or adhere to a substantially smooth surface such as the feeding table 12 of an infant's highchair without transverse sticking. With the inherent stickiness of the mat 10, the plate 26, through the suction cup 14 is held to the feeding table 12. By creating the small volume 38 which is a vacuum or at least a partial vacuum, this serves further to hold the mat 10 against the surface 12, thereby increasing the efficiency of the holding action of the mat 10 upon the surface 12 and in particular, enhancing the suction effect of the concavity 31. Indeed multiple concavities may be formed in the underside to provide a multiple sucker effect in the same manner. Alternatively, a sticky or adhesively may be applied to the underside of the mat 10 in order to increase the efficiency of the adhesive action to the surface 12. It will be appreciated that the ridge 22 may take any shape or configuration as long as it serves to urge the utensil away from the supporting surface, for example a series of bumps or projections.

Referring now to FIG. 4c, the operation of the mat 10 restricting movement of the feeding plate 26 relative to the feeding surface 12 will now be described in more detail. In this example, the user (not shown) has attempted to move the feeding plate 26 in the direction indicated by the arrow 40, that is away from the feeding table 12. As shown, the suction cup 14 continues to hold on to the feeding plate 26 such that a larger area 37a of deformation in the mat 10 results. Also as shown, the feeding plate 26 is lifted clear of the resilient ridge 22. The outcome of the pulling action 40 is that the pulling force is transferred from the feeding plate 26 through the suction cup 14 and the point of join 32 to the mat 10 such that the area 37a of the mat is pulled away from the table 12 causing a larger volume 42 of vacuum between the mat 10 and the surface 12. The resultant effect of this pulling force 40 is that the deformable properties of the mat 10 result in an increased holding action denoted by the large arrow 34a downwards to the surface 12 thereby holding the plate 26 close to the table 12. The properties of the mat and suction cup are such that an infant will not have the required strength in order to dislodge the mat from the table in this way.

Figure 5A:
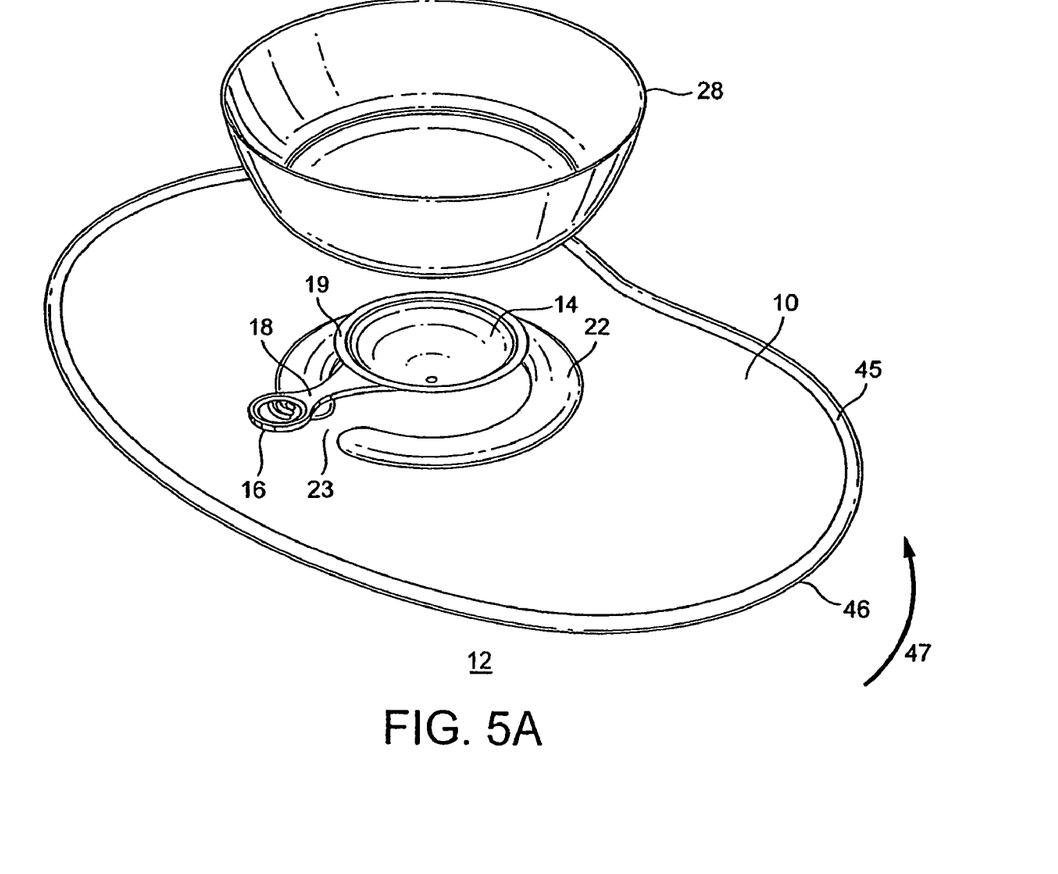
FIGS. 5a and 5b are perspective views illustrating the operation of a mat according to an embodiment of the present invention respectively before and after a utensil is held by the device.
Figure 5B:
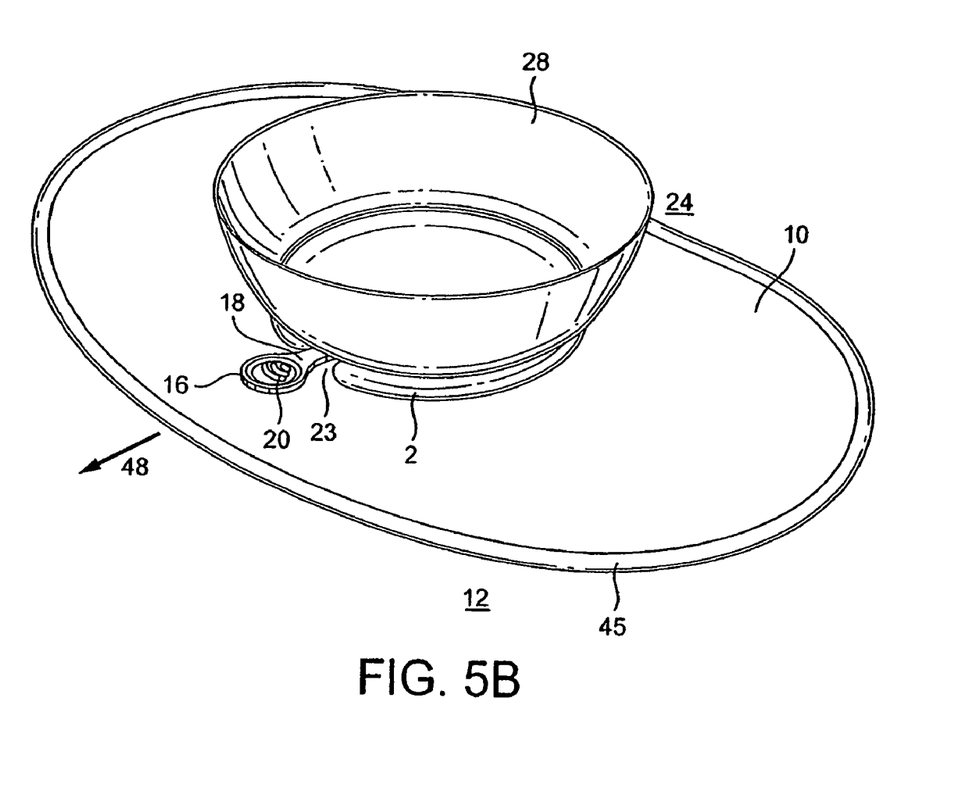

The means of removal of the mat 10 from the table 12 will now be discussed with reference to FIGS. 5a to 5b. FIG. 5a illustrates an embodiment of the invention of the mat 10 on a feeding surface 12. As before, the mat 10 comprises the suction cup 14 with its release handle 16 attached to the suction cup 14 at the peripheral edge 19 through the flexible strap 18 which joins to the suction cup 14 at the upper peripheral edge 19 of the suction cup 14. In this view, the feeding bowl 28 is shown raised above the mat 10 ready for placement upon the suction cup 14. As shown, the strap 18 of the release handle 16 is raised such that it is vertically spaced from the mat 10. When the bowl 28 is in the engaged position as shown in FIG. 5b, the action of placement of the bowl on the suction cup 14 forces the upper peripheral edge of the suction cup 14 and tends to flatten the suction cup 14 against the mat 10. In this instance, the flexible strap 18 projects out of the enclosed area defined by the inner circumference of the ridge 22 through the gap 23 in the ridge 22. In this position, the bowl 28 may be filled with food and/or liquid for the purposes of the infant feeding. When the infant has finished feeding from the bowl 28 or the parent wishes to remove the bowl 28 from the mat 10, it is necessary to release the bowl from the mat 10 by operating the release handle 16 to release the suction force exerted by the suction cup 14 upon the bowl 28 by breaking the vacuum or partial vacuum formed by the suction cup holding the bowl 28. In order to do this, the parent may operate the release 16 by holding the knurling 20 on the operating device 18 and pulling in the direction indicated by the arrow 48. As the suction cup 14 in this embodiment is also manufactured of TPE which is a resiliently deformable material, the pulling action is transferred to the point 19 on the upper peripheral edge of the suction cup 14 through the strap 18 thereby deforming the substantially circular peripheral edge and pulling the point 19 away from engagement with the bowl 28. By deforming the shape of the suction cup, the vacuum holding the bowl to the suction cup is broken and the bowl 28 may be simply lifted from the suction cup 14 with little or no force. Advantageously, as the mat is asymmetric and has an indentation 24 which faces the infant in use, the operating device and strap is located at the opposite side of the bowl and mat from the infant. This ensures that the infant cannot access the operating device when the parent does not want the infant to do so. The release means are therefore located at a point which is inaccessible by the infant.

Referring again to FIG. 5a, in order to remove the mat, and to overcome the formation of a vacuum between the mat 10 and the surface 12, a parent simply has to peel the mat from the table by grasping the mat at a point 46, for example, on the mat 10 and pulling in the direction indicated by the arrow 47. By pulling in the direction shown, there is no formation of a vacuum between localised area of the mat 10 and the surface 12 and the mat 10 peels away from the surface 12 with little or no effort.

Also as shown in FIGS. 5a and 5b, the mat 10 comprises a border 45 around the periphery of the mat 10. In this area 45, the mat is of a thickness which is less than the remainder of the mat. The purpose of this is to make grasping of the mat edge more difficult for the infant as the infants tends to be less dextrous than adults and therefore cannot remove the mat 10 from the surface 12 in the manner described above.

Figure 6:
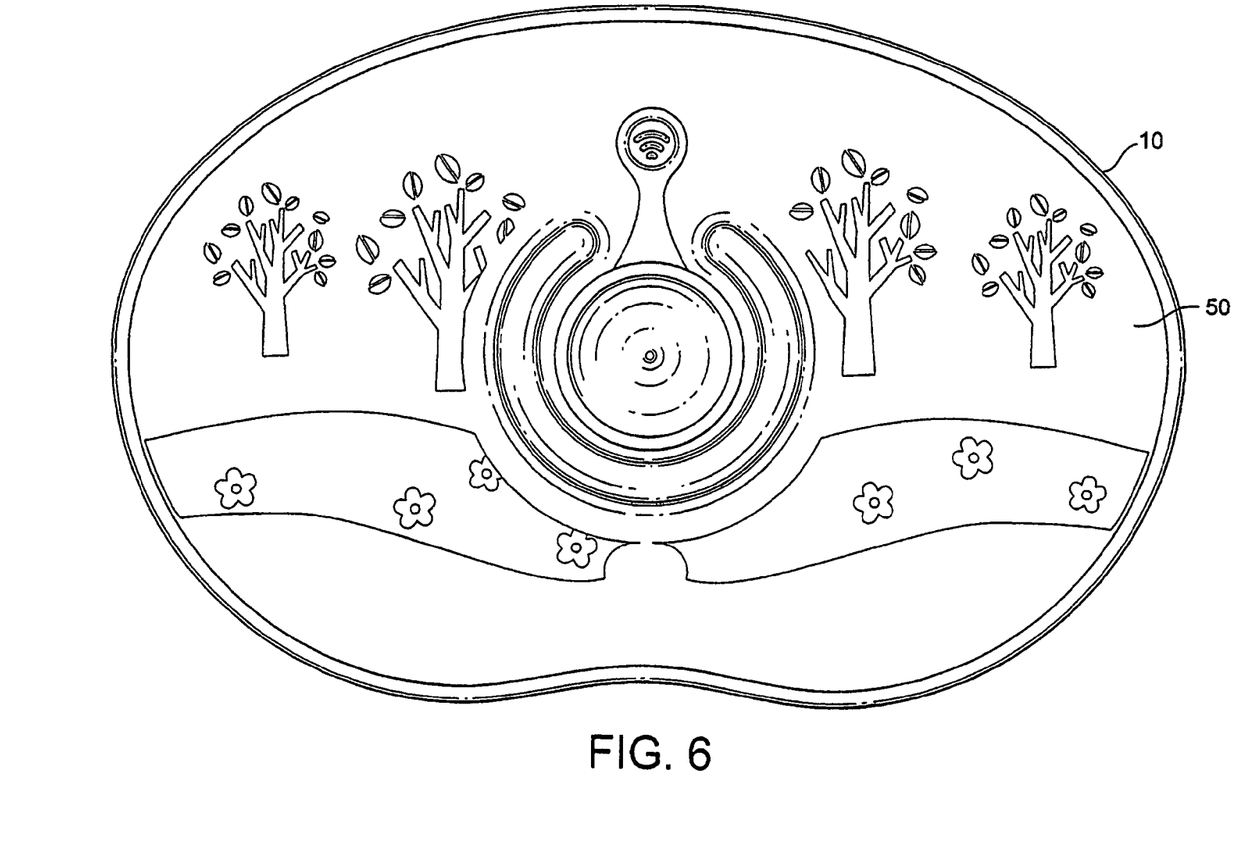
FIG. 6 is a plan view illustrating of a mat in accordance with an embodiment of the present invention.

In order to enhance the pleasure of the feeding experience for the infant and to further remove stresses of the experience for the infant, the mat 10 may be advantageously provided with a surface decoration as in the area 50 as illustrated in FIG. 6. The mat 10 may conveniently be provided in a range of surface decorations in order to suit the preferences of the infant and/or the parent. For example, the infant's favorite cartoon character may appear on the mat.

Figure 7A:
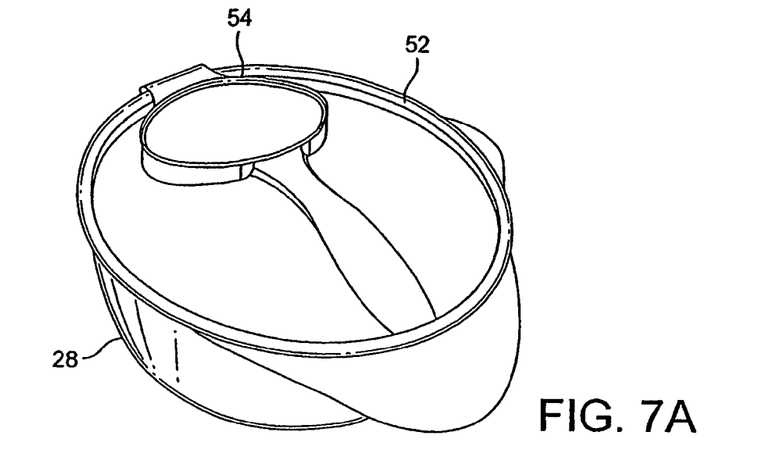
FIGS. 7a to 7c are perspective views illustrating a closure in accordance with an embodiment of the present invention.
Figure 7B:
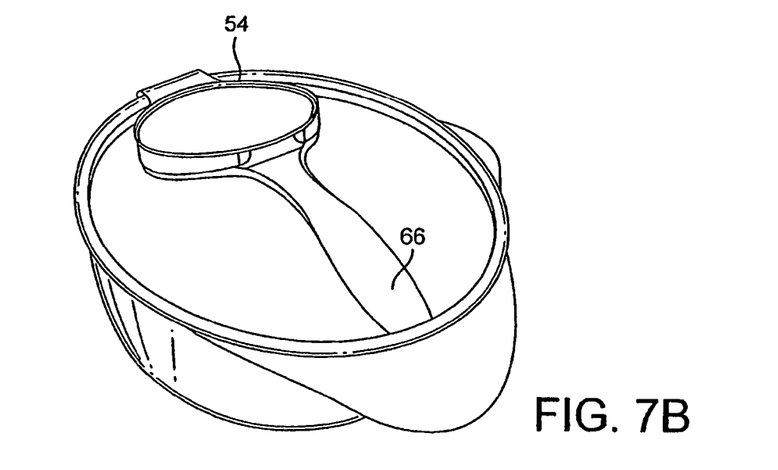
Figure 7C:
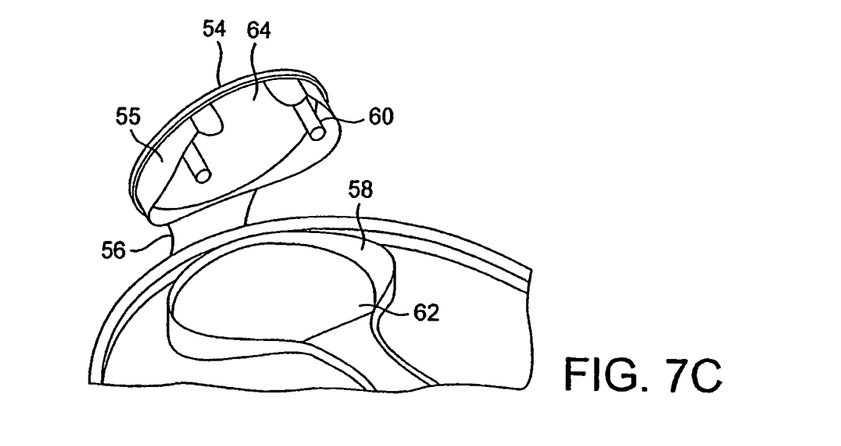

The invention may also extend to a kit of parts comprising a mat 10 and one or more of a feeding plate 26 or a feeding bowl 28 or other utensil. The feeding plate 26 or feeding bowl 28 may be provided with a closure 52 as illustrated in FIGS. 7a to 7c. The closure 52 is removably fixed upon the bowl 28 as shown in FIG. 7a. The closure 52 also has a hygiene cover 54 which in the embodiment illustrated in FIG. 7c is formed as a one piece moulding with the closure 52 and joined to the closure 52 by means of a flexible strap 56. The hygiene cover is removable from the upper surface of the closure 52 but is conveniently held locally to the closure 52 through the flexible strap 56. Holes 62 are preferably provided in the upper surface of the closure 52 beneath the hygiene cover 54 for the purpose of providing steam venting means for the venting of any steam generated when food contents of the bowl 28 are heated in, say, a microwave oven (not shown). When the hygiene cover 54 is located in place projections 60 downwardly depending from the top surface of the hygiene cover 54 engage with the holes 62 in order to provide a seal thereby ensuring little or no spillage of the contents of the bowl 28. The hygiene cover 54 further has downwardly depending skirts 55 which project downwardly from the upper outside edge. The purpose of the skirts 55 is to provide an enclosed space defined by the upper surface of the hygiene cover 54, the skirts 55 and an opposed area of the upper surface of the enclosure 52. A gap 64 is provided in the skirt 55 for the insertion of part of an eating utensil such as a spoon or fork, the handle of which is received in an area 66 of the upper surface of the closure 52 as illustrated in FIG. 7b for example on a snap fit. The hygiene cover 54 thereby allows a means of keeping the eating end of the eating utensil clean and hygienic during transportation and/or storage.

Figure 8A:
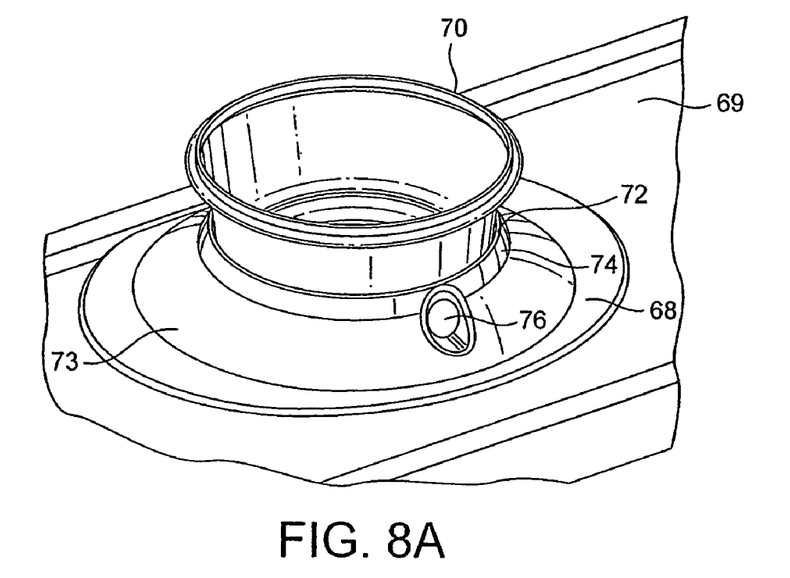
FIGS. 8a and 8b are perspective views illustrating a mat and bowl assembly in accordance with an embodiment of the present invention.
Figure 8B:
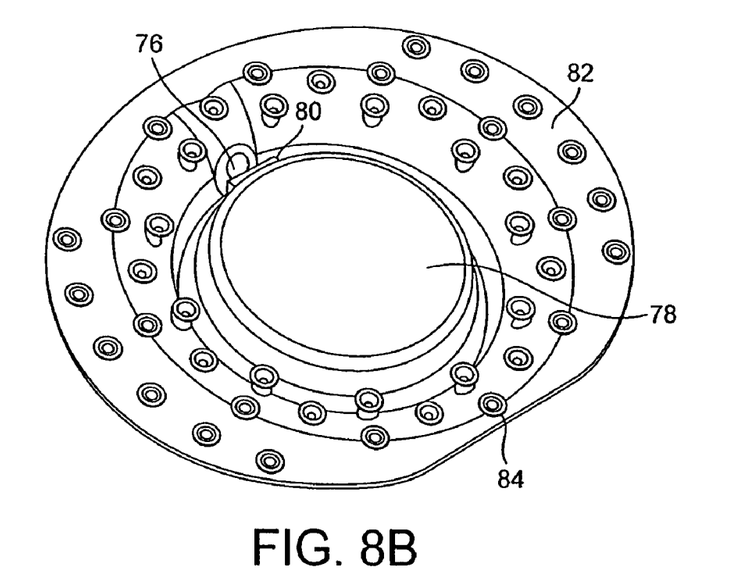

An alternative embodiment of a mat according to the present invention is illustrated in FIGS. 8a and 8b. In this embodiment, a mat 68 is also made of TPE so that it may adhere to the feeding surface 69. The mat is held in place as described before or by means of individual suction cups 84 on the underside 82 of the mat 68 as demonstrated in FIG. 8b. In use, the bowl 70 is received in an open recess 72 surrounded by a collar 74 in the mat 68 and returned there by a retention mechanism. A portion 73 of the mat raises gradually from a thin peripheral portion of the mat 68 to the raised recess 72 and collar 74 to provide sufficient space for the retention mechanism of the bowl 70. Retention mechanisms for such devices are well known in the art and as such are not described in detail here. Typical devices used for retention are twist and lock devices. Release means 76 are also provided on the mat to allow the parent to release the bowl 70 from the mat 68. As described above, the release means 76 may be provided at an end of the mat which is opposite to the infant when seated so that the infant cannot access the operating means 76 thereby to release the bowl 70 from the mat 68. In this embodiment, the release means 76 is a push button as shown. On the underside view of the mat 68, the reverse side of the operating button 76 can be seen and operates to release the bowl 70, the underside 78 of which is shown in FIG. 8b. It will be appreciated that any appropriate release mechanism can be adopted. For example the operating button can be spring-loaded to a non-release position and can include a projecting arm having a detent or catch engaging a feature on the bowl. When the button is depressed against the bias the detent releases the feature on the bowl allowing the bowl to be removed.

Figure 9A:
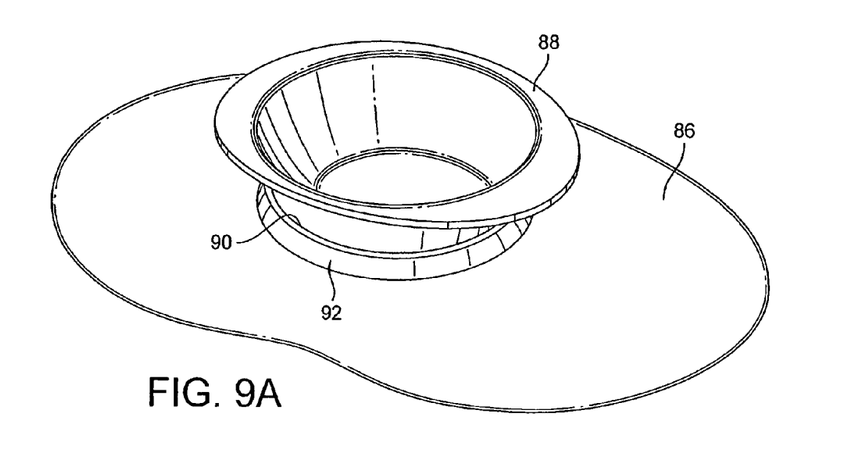
FIGS. 9a to 9c are perspective views illustrating a further alternative embodiment of the invention.
Figure 9B:
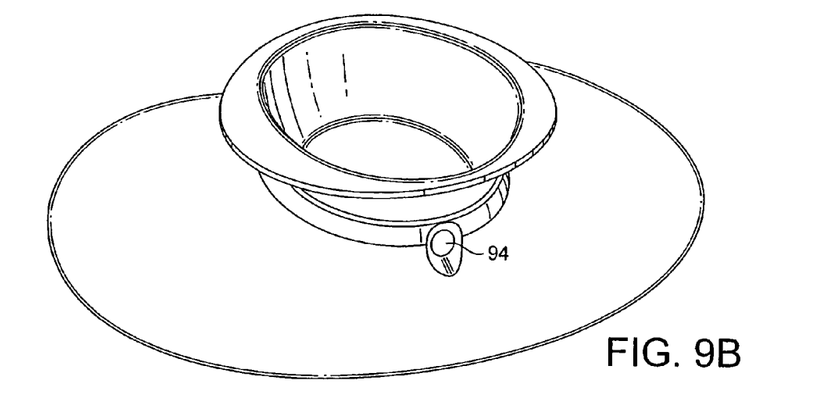
Figure 9C:
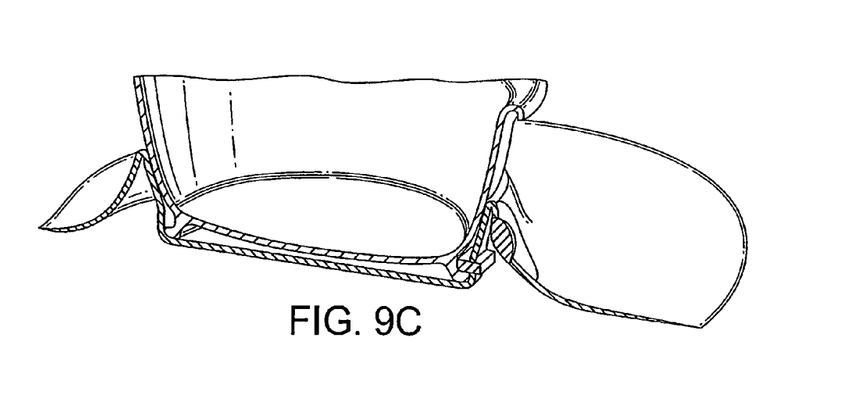

A further embodiment of the present invention is illustrated in FIGS. 9a to 9c. This embodiment varies from the embodiment of FIG. 8 in that the mat 86 is substantially flat as shown. The mat has a recess 90 for the insertion and retention of a bowl 88 the recess being defined by a raised portion formed by a collar 92. With reference to FIG. 9b, a reverse angle view of the embodiment is shown along with the release button 94. With reference to FIG. 9c, the operating mechanism works in the following manner. In the same manner as described with reference to FIG. 8, the release button is spring-loaded to an engaged position and includes a detent which engages a feature of the underside of the bowl such that depression of the release button releases the bowl.

With reference to FIGS. 10a to 10d, a further embodiment of the present invention will now be described. In this aspect of the invention there is provided a base for placement upon a support surface and for holding a utensil, wherein the base further comprises a clamp for clamping the base to the support surface. In embodiments of the invention, the clamp is a G-clamp. In one embodiment of the invention, the clamp has a spring loaded ratchet mechanism for adjusting the one or more clamping jaw to the support surface. The ratchet mechanism also provides retaining means for holding the clamping jaw or jaws at the correct position.

Figure 10A:
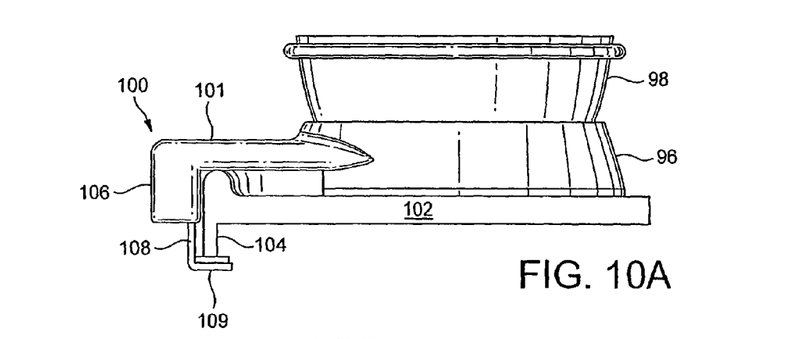
FIGS. 10a to 10d are perspective views illustrating yet a further alternative embodiment of the invention.

FIG. 10a shows a base 96 comprising a clamp, generally referred to by reference numeral 100. The base is arranged to have a substantially flat underside for sitting stably on a surface. The clamp 100 comprises a portion which extends horizontally from the base and is arranged such that in use the horizontal portion 100 over hangs a lip 104 of the support surface 102. At the end of the horizontally extending portion there is a downwardly depending portion 106 which houses the ratchet mechanism. From the downwardly depending portion 106 the clamping jaw 108 extends further downwardly with a horizontally extending portion 109 directed back towards the direction of the base for gripping the downwardly depending lip 104 of the surface 102, and holding the base in place by virtue of the bias provided by the spring loading mechanism.

Figure 10B:
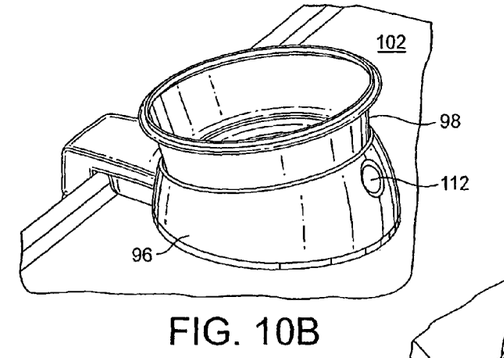
Figure 10C:
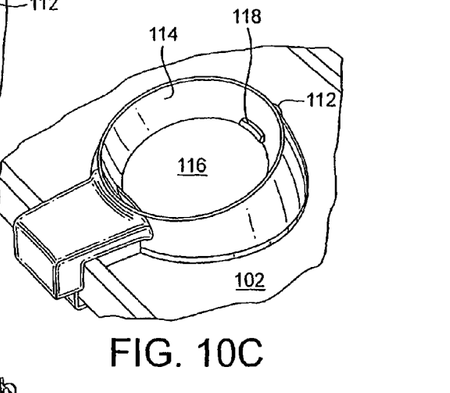

As shown in FIG. 10b, the base 96 also has a release means 112 in this case, an operating button. With reference to FIG. 10c, it can be seen that the button has an internal operating actuator 118 which sets up the base 116 of the recess 114 for receiving the bowl 98, and can operate in a similar manner to the release button of FIG. 8 or FIG. 9.

Figure 10D:
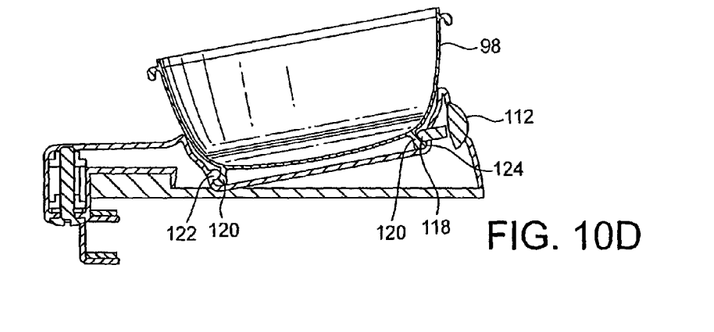

Referring now to FIG. 10d, it will be seen that the bowl 98, when in situ has a downwardly projecting skirt 120 with an outwardly projecting annular lip 124 arranged to inter engage below the actuator 118. When in position, the bowl is held in place by the means of the retention means 122 and the depression of the operating button 112 operates on the actuator to withdraw it and allows the user to remove the bowl 98 from the retention means 122.

It will be appreciated that the present invention has been described by way of example only. For example, the invention may be and in conjunction with any appropriate utensil for any user infant or adult and for the elderly or disabled, and on any appropriate support surface. Furthermore, the mat may take any appropriate shape and the formed of any appropriate material, and if any suitable type of securing element may be used.

For example the mat can be used as a non slip feeding mat for pet feeding or in travel applications for example as a feeding mat in a car or aeroplane. Indeed the mat can be used as a dual use car feeding mat and car window sunshade or toy tidy in which the mat can be placed against a window and toys or other objects adhered to it in the manner described above. In a further implementation the mat can comprise a paint pallet on which paint is mixed and the item held can comprise a water cup holder. Yet further the mat can be used for bath time applications for example as a bath mat, as a soap or other toiletry holder or as a toy holder which can be adhered to a wall. Yet further the invention can be used in relation to cooking implementations for example holding a mixing bowl to a worktop. Generally it will be seen that the mat can be adhered to horizontal, vertical or upside down surfaces or any other inclination of surface.

It will also be appreciated that the features of one aspect of the invention may be applied to other aspects of the invention.

What is claimed is:

1. A mat comprising: a resiliently deformable mat portion having a border about a periphery of the mat portion and a securing element provided thereon for securing an item attached thereto against movement relative to the mat portion, the mat portion having a generally flat portion having a horizontal upper surface and a horizontal lower surface, and wherein the mat portion is arranged to grip a support surface on which the mat portion is laid, in use, by formation of at least a partial vacuum between a portion of the horizontal lower surface of the mat portion and the support surface upon deformation of the mat portion, wherein the mat comprises a projection on an interior portion of the upper surface of the mat portion spaced inward from the border, wherein the flat portion extends between the projection and the border, and positioned proximate the securing element so that the projection will be under the item in order to urge the item away from the support surface when held by the mat, wherein the action of the item being urged away from the support surface creates a deformation in the mat portion and thereby forms the partial vacuum between the mat portion and the support surface, wherein the deformation is aligned with the securing element and is substantially within a boundary defined by the projection.

2. A mat according to claim 1 in which the projection comprises one of a rib and at least one protrusion.

3. A mat according to claim 1, wherein the securing element includes a release to facilitate release of a utensil.

4. A mat according to claim 3, wherein the securing element comprises a suction cup.

5. A mat according to claim 4, wherein the release comprises an operating tab attached to a peripheral edge of the suction cup.

6. A mat according to claim 4 in which the projection comprises one of a rib and at least one protrusion and wherein the rib and suction cup are dimensioned so that, when in use, a peripheral edge of the suction cup lies within an area defined by the rib.

7. A mat according to claim 1, wherein the mat portion comprises material having a friction or tack co-efficient of a pre-determined value to enhance gripping of the support surface.

8. A mat according to claim 1, wherein at least a portion of the periphery of the mat portion is of reduced thickness, as compared to the remainder of the mat portion.

9. A mat according to claim 1, wherein the mat is integrally formed.

10. A mat as claimed in claim 1 comprising one or more of a feeding mat, a window sunshade, a toy tidy, or a paint pallet.

11. A mat as claimed in claim 1 in which the support surface is a horizontal, vertical or upside down surface.

12. A mat according to claim 3, wherein the release comprises an operating tab attached to a peripheral edge of the suction cup.

13. A mat according to claim 2 in which the projection comprises one of a rib and at least one protrusion and wherein the rib and suction cup are dimensioned so that, when in use, a peripheral edge of the suction cup lies within an area defined by the rib.

14. A mat according to claim 3 wherein the projection includes a gap positioned proximate the release.

15. A mat according to claim 1 further comprising a first concavity wherein the first concavity has a concave surface directed downward that forms part of a lower surface of the mat.

16. A mat according to claim 15 wherein the first concavity is aligned with the securing element.

17. A mat comprising:
 a mat portion having a flat upper surface and a peripheral border, the mat portion formed of a thin layer of flexible material;
 a suction cup connected to the mat and extending over a portion of the upper surface of the mat portion within the peripheral border for securing an item to the mat; and,
 an upward projection on the upper surface of the mat portion proximate to the portion of the upper surface the suction cup extends over and positioned to be under the item to separate the item from the flat upper surface, wherein the flat upper surface extends between the upward projections and the border, and wherein the upward projection urges the item away from the upper surface of the mat portion to create a deformation in a lower surface of the mat and thereby form a vacuum, the deformation being generally aligned with the suction cup and within a boundary defined by the upward projection.

18. A mat according to claim 17 wherein the projection is positioned in order to urge the item away from the support surface when the item is initially secured to the mat, wherein the action of the item being urged away from the support surface creates a deformation in the mat portion and thereby forms the partial vacuum between the mat portion and the support surface.

19. A mat according to claim 17 further comprising a first concavity wherein the first concavity has a concave surface directed downward.

20. A mat according to claim 19 wherein the first concavity is aligned with the suction cup.

* * * * *